2,816,080
Patented Dec. 10, 1957

2,816,080
2-(O-HYDROXYPHENYL)-2-IMIDAZOLINE SALICYLATE

Tsai Hsiang Chao, Somerville, N. J., assignor to American Cyanamid Company, New York, N. Y., a corporation of Maine No Drawing. Application June 14, 1956, Serial No. 591,285

2 Claims. (Cl. 252—392)

This invention relates to 2 - (o - hydroxyphenyl) - 2-imidazoline salicylate, a new chemical compound, to methods for its preparation, and to the deactivation of copper in copper-containing organic compounds subject to oxidative deterioration by adding it thereto.

2-(o-hydroxyphenyl)-2-imidazoline salicylate has the structural formula

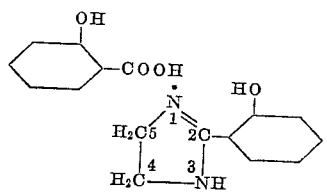

It is a white crystalline compound that melts at 219°–223° C. with decomposition and is soluble in gasoline, lubricating oil and other petroleum solvents and in triglyceride oils and fats to the extent necessary for the deactivation of dissolved copper therein.

I have found that this compound can be prepared by reacting salicylic acid with a solution of 2-(orthohydroxyphenyl)-2-imidazoline in a polar solvent such as ethyl alcohol. The imidazoline salicylate may also be produced directly by refluxing a solution of two mols of salicylic acid and one mol of ethylenediamine in a high-boiling neutral solvent such as orthodichlorbenzene and removing the water formed. Both methods result in a product that can be purified by recrystallization from ethanol.

The new compound of my invention is particularly useful as a metal deactivator in fats, oils and soaps containing dissolved copper and may be used in conjunction with any known or approved antioxidant such as N-butyl-p-aminophenol, 2,2' - methylenebis - (4 - methyl - 6 - tert.-butylphenol), N,N'-isopropyl or di-isobutyl-p-phenylenediamine and the like, as will hereinafter be more fully described.

The invention will be further described and illustrated by the following examples to which, however, it is not limited.

Example 1

A mixture of 47 parts by weight of salicylic acid, 10.2 parts of 68% aqueous ethylenediamine solution and 70 parts by volume of o-dichlorbenzene is heated with stirring for about six hours or until formation of the imidazoline is complete. The mixture is then distilled until about 55 parts by volume of o-dichlorbenzene are removed after which the residue is cooled. The product is separated by filtration and recrystallized three times from anhydrous ethanol; it is 2-(o-hydroxyphenyl)-2-imidazoline, a white crystalline material melting at 203°–208° C. uncorrected.

Equimolecular quantities of the compound and of salicylic acid are dissolved in hot anhydrous ethyl alcohol and the solution is evaporated to dryness. The resulting 2-(o-hydroxyphenyl)-2-imidazoline salicylate is obtained as white crystals melting at 219°–223° C. with decomposition.

Example 2

A mixture of 23.5 parts by weight of salicylic acid, 5.1 parts of ethylenediamine as a 68% aqueous solution and 50 parts of xylene is heated at reflux for about 4 hours. The xylene is then separated by decantation and 50 parts of o-dichlorbenzene are added to the residue and the mixture heated to reflux temperature. The water formed in the reaction is distilled off and any o-dichlorbenzene that separates is dried and returned to the flask; this is continued until the distillate is clear anhydrous o-dichlorbenzene.

Upon cooling the resulting solution to room temperature, the 2-(o-hydroxyphenyl)-2-imidazoline salicylate separates and is filtered off. It is washed with benzene and then with n-hexane and recrystallized from ethanol. The crystals are similar in appearance and melting point to the product of Example 1.

Example 3

The 2-(o-hydroxyphenyl)-2-imidazoline salicylate was tested as a metal deactivator in gasoline by the standard ASTM-D525–49 test wherein the samples are subjected to oxygen pressure in a bomb and the induction period before active absorption of oxygen is measured. The antioxidant used was 2,2'-methylenebis-(4-methyl-6-tert.-butylphenol). Where copper was present it was added to the gasoline as copper naphthenate in a quantity equivalent to 1 part per million of copper. The results of the tests were as follows:

| 2-(o-hydroxyphenyl)-2-imidazoline salicylate | Percent Antioxidant | Induction Period, Min. | | Percent Restoration |
|---|---|---|---|---|
| | | No Cu | 1 p.p.m. Cu | |
| None | None | 50 | 35 | |
| 0.003 | None | 68 | 70 | |
| 0.01 | 0.01 | 158 | 145 | 91.6 |
| 0.003 | 0.01 | 178 | 166 | 93.4 |
| 0.002 | 0.01 | 203 | 176 | 86.6 |

The efficiency of a metal deactivator is measured by the extent to which it restores the protective action of a gasoline antioxidant in the presence of copper as measured by the induction period. It will be seen that the compound of the present invention is highly efficient for this purpose even when it is used at the low concentration of 0.002% in the gasoline.

It will be understood that 2 - (o - hydroxyphenyl) - 2-imidazoline salicylate will function as a copper deactivator in any copper-containing organic material subject to oxidative deterioration and can therefore be used in any such material and with any organic antioxidant. In addition to gasoline it can be added to kerosenes, fuel oils, hydrocarbon lubricants such as those of SAE 10–60 grade, paraffin wax and other hydrocarbons of petroleum origin and also to glyceride oils and fats such as tallow, lard, oleomargarine, coconut oil and the like. It can also be used in soaps such as ordinary hand soap (alkali metal stearates, etc.) either alone or in conjunction with antioxidants. The quantity to be added is independent of the amount or kind of antioxidants used, but should ordinarily be sufficient to deactivate all of the dissolved copper. Theoretically one mol of the compound is needed to combine with and deactivate one mol of copper but for best results at least a slight excess over theory should be used. Larger quantities and particularly quantities within the range of about 0.005% to 0.5% are usually preferred, however, in order to protect the organic material and antioxidant against additional contamination from copper pipes or storage vessels, bronze bearings or other sources.

What I claim is:
1. 2 - (o - hydroxyphenyl) - 2 - imidazoline salicylate.
2. A method of deactivating copper in a copper-containing organic material subject to oxidative deterioration which comprises adding thereto an effective amount of 2-(o-hydroxyphenyl)-2-imidazoline salicylate.

References Cited in the file of this patent

UNITED STATES PATENTS 2,505,247  Isler _____ Apr. 25, 1950

OTHER REFERENCES

A. P. C. No. 199,933 Official Gazette, vol. 659, p. 1107 (1952).